March 5, 1963 L. F. KING ET AL 3,080,436
PROCESS FOR IMPROVING THE ODOR OF PARAFFINIC HYDROCARBONS
Filed Aug. 25, 1958
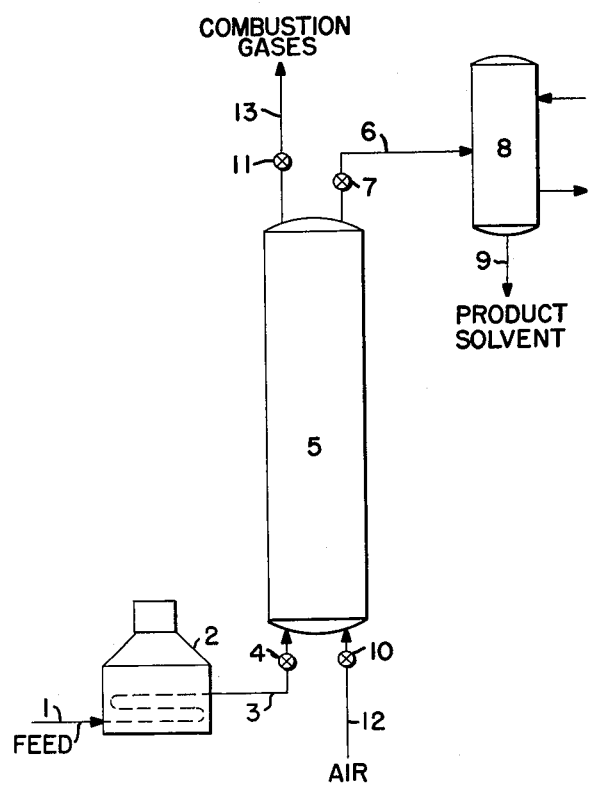
Laurence F. King
Clellie T. Steele     Inventors
By James E. Reed   Attorney United States Patent Office 3,080,436
Patented Mar. 5, 1963

3,080,436
PROCESS FOR IMPROVING THE ODOR OF PARAFFINIC HYDROCARBONS
Laurence F. King, Mooretown, Ontario, and Clellie T. Steele, Sarnia, Ontario, Canada, assignors to Esso Research and Engineering Company, a corporation of Delaware
Filed Aug. 25, 1958, Ser. No. 756,945
12 Claims. (Cl. 260—676)

The present invention relates to a method for improving the odor characteristics of paraffinic hydrocarbons and more particularly relates to an improved process for removing malodorous constituents from synthetic branched chain paraffins intended for use as hydrocarbon solvents.

Hydrocarbon solvents boiling in the range between about 100° and about 500° F. are widely used in the paint and varnish industry; in dry cleaning plants; in the manufacture of printing inks, insecticides, polishes and similar products; and in many other applications wherein solvent odors must be carefully controlled. In recent years there has been a growing trend toward the use of solvents produced from synthetic branched chain paraffins in such applications. By alkylating a low molecular weight olefin with an isoparaffin or by polymerizing low molecular weight olefins and hydrogenating the polymer product, solvents essentially free of the aromatic and naphthenic hydrocarbons and sulfur, nitrogen and oxygen compounds responsible for the offensive odors of solvents prepared from straight run petroleum distillates can be prepared. Such solvents are, however, not completely odorless. It has been found that such solvents, regardless of whether they are prepared by alkylation or by polymerization, contain trace quantities of certain malodorous materials. The identity of these odorivectors has not been established but it is known that they are materials of relatively high refractive index and are not the simple contaminants to which the offensive odors of paraffinic fractions can usually be traced. Attempts to remove them by blowing with air, nitrogen and carbon dioxide, by acid washing, by caustic treatment, and by the use of a wide variety of adsorbents have been unsuccessful. As a result of the presence of these materials, solvents prepared from synthetic branched chain paraffinic hydrocarbons are often unsatisfactory for use in applications where odor requirements are critical.

In accordance with the present invention, it has now been discovered that essentially odorless solvents can be prepared from synthetic branched chain paraffin hydrocarbons by contacting the hydrocarbons with crystalline metallic alumino-silicate adsorbents having uniform pore diameters of about 4 Angstrom units. It has been found that such adsorbents selectively adsorb the trace constituents responsible for the poor odor characteristics of such hydrocarbons and permit the recovery of an essentially odorless product in extremely high yields. Treatment with the adsorbents may be readily carried out and provides a process for improving the odor characteristics of synthetic branched chain paraffins which is both highly effective and economically attractive.

The crystalline metallic alumino-silicate adsorbents employed for removing malodorous constituents from synthetic branched chain paraffin hydrocarbons in accordance with the invention are crystalline zeolites having large numbers of submicroscopic cavities interconnected by many smaller pores or channels which are extremely uniform in size. In general, these pores or channels may have diameters of from about 3 to about 15 Angstrom units, depending upon the zeolite composition and the conditions under which the crystals were formed, but for a given zeolite all of the pores are of the same diameter. Adsorption takes place within these pores and therefore only those materials having an affinity for the zeolite and having molecular diameters small enough to enter the pores are retained by the zeolite. Because of this selective adsorbing action, such zeolites are commonly referred to as molecular sieves.

The scientific and patent literature contains numerous references to the composition and selective adsorbing action of molecular sieves. In general, they are alkali metal or alkaline earth metal alumino-silicates and may be either natural or synthetic in origin. Typical of the naturally occurring zeolites having molecular sieve properties are analcite, $NaAlSi_2O_6.H_2O$, and chabasite, $CaAlSi_4O_{12}.6H_2O$. Synthetic zeolites having similar properties are described, for example, in U.S. Patents Nos. 2,306,610 and 2,522,426 and in articles by Breck and others which appeared in the Journal of the American Chemical Society, volume 78, page 593 et seq. in December 1956.

As mentioned heretofore, the molecular sieve adsorbents employed for removing malodorous constituents from synthetic branched chain paraffin hydrocarbons in accordance with the invention are those characterized by uniform pore diameters of about 4 Angstrom units. The paraffin hydrocarbons have molecules too large to be adsorbed by the sieves but the constituents responsible for odor apparently have molecular diameters small enough to enter the sieve pores and hence are adsorbed. This results in high selectivity and permits product recoveries up to 99% or higher.

Molecular sieve adsorbents having uniform pore diameters of about 4 Angstrom units are now available commercially and can be produced in a number of different ways. One suitable process for preparing such adsorbents involves the reaction of sodium silicate, preferably sodium metasilicate, with sodium aluminate under carefully controlled conditions. The sodium silicate employed should have a ratio of soda to silica between about 0.8 to 1 and about 2 to 1. Water glass and similar sodium silicate solutions having lower soda to silica ratios ordinarily do not produce the selective adsorbent crystals unless they are subjected to extended heat soaking or recrystallization treatment. Sodium aluminate solutions having a soda to alumina ratio in the range of from about 1 to 1 to about 1 to 3 may be employed. High soda to alumina ratios are preferred and solutions having soda to alumina ratios of about 1.5 to 1 or higher are particularly preferred. The amounts of the sodium silicate and sodium aluminate solutions employed should be such that the ratio of silica to alumina in the final mixture ranges from about 0.8 to 1 to about 3 to 1 and preferably ranges from about 1 to 1 to about 2 to 1.

These reactants are combined in a manner to produce a precipitate having a uniform composition. A preferred method is to add the aluminate to the silicate at ambient temperature with sufficient agitation to produce a homogeneous mixture. This mixture is then heated to a temperature of from about 180° to about 215° F. and held at that temperature for a period of from about one-half hour to about three hours or longer. Lower temperatures may be employed but in that case a somewhat longer reaction period will be required. At temperatures in excess of about 250° F. a crystalline composition having the requisite size uniform pore openings is not obtained. The pH of the solution should be maintained on the alkaline side, at about 12 or higher, during the crystallization step. At lower pH levels crystals having the desired properties are not readily formed. The crystals which are precipitated as a result of reaction between the silicate and aluminate under these conditions will have uniform pore diameters of about 4 Angstrom units.

The crystals prepared as outlined above are recovered in a finely divided state and it is generally preferred to form them into pellets by means of a suitable binder material before they are dried and calcined. Any of a number of binder materials conventionally used in the manufacture of catalysts and adsorbents may be employed for this purpose. A binder consisting of bentonite, sodium silicate and water has been found satisfactory, for example. In using this binder, the constituents should be mixed so that, on a dry basis, the product contains from about 5 to 10% bentonite, about 5 to 15% sodium silicate, and about 75 to 90% of the silica-alumina crystals. The total mixture should contain from about 25 to 35% water. This mixture may be readily extruded or otherwise shaped into particles of convenient size. These are then dried and calcined at temperatures of from 700 to 900° F. or higher to produce the finished molecular sieve. Molecular sieves of similar properties may be produced by other processes and may also be employed in the process of the invention.

Contacting of the synthetic branched chain paraffin hydrocarbons with 4 A. molecular sieves in order to improve their odor characteristics in accordance with the invention is preferably carried out in vapor phase at temperatures in the range of from about 250 to about 700° F. Temperatures in excess of about 700° F. result in cracking reactions which lead to odor degradation; while little improvement in odor is obtained at temperatures below about 250° F. Temperatures of from about 400° to about 500° F. have been found to be particularly effective from the standpoint of product yield and odor intensity and are therefore particularly preferred. The pressure employed during the contacting step may be varied over a considerable range and, since the contacting is carried out in vapor phase, will depend in part upon the hydrocarbon volatility characteristics. In general, pressures of from about 50 millimeters of mercury to about 100 pounds per square inch may be employed but it is usually preferred to conduct the contacting step at about atmospheric pressure or only slightly in excess thereof. Feed ratios in the range of from about 0.1 to about 3 volumes of hydrocarbons per volume of sieve per hour are suitable.

Malodorous constituents adsorbed by the molecular sieve adsorbents may be removed therefrom at periodic intervals by various methods including steaming at elevated temperatures, evacuation, and the passage of hot gases such as nitrogen, carbon dioxide and low molecular weight hydrocarbons through the sieve bed. Generally, however, it is preferred to regenerate the sieve by passing air or other oxygen-containing gas through the adsorbent and burning off the adsorbed material. In carrying out such a regeneration step, the air or oxygen-containing gas is preferably preheated to a temperature in the range of from about 500 to about 800° F. before it is contacted with the sieve crystals. These temperatures are sufficiently high to initiate combustion of the material adsorbed upon the sieve. Somewhat higher temperatures are produced as combustion of the adsorbed materials occurs but these persist for only a brief instant at any one spot within the adsorbent bed and hence the sieve crystals are not appreciably impaired by this treatment. Because the amount of material adsorbed from the feed is extremely small, such regeneration must be carried out only at infrequent intervals.

The synthetic branched chain paraffin hydrocarbons from which malodorous constituents are removed in accordance with the invention are generally prepared by the alkylation of a low molecular weight olefin with a low molecular weight paraffin or by the polymerization of low molecular weight olefins, followed by hydrogenation of the polymer product. Alkylation processes suitable for the production of such synthetic branched chain paraffins are widely employed for the production of high octane motor fuel blending components and will be familiar to those skilled in the art. Catalysts employed in such processes include sulfuric acid, fluorosulfonic acid, chlorosulfonic acid, hydrofluoric acid, boron fluoride-water, boron fluoride-phosphoric acid, aluminum chloride-hydrogen chloride, aluminum chloride-aluminum bromide, sodium chloride-aluminum chloride and similar complexes of aluminum halides and other salts, activated clays and the like. Such processes are usually carried out using olefins containing from about 2 to about 7 carbon atoms per molecule and isoparaffins containing from about 4 to about 8 carbon atoms per molecule as feed materials. Although a wide range of operating temperatures may be employed depending upon the particular catalyst system used, in general, alkylation processes are conducted at temperatures between about 0° F. and about 100° F. The alkylate obtained therefrom generally boils in the range between about 100° F. and about 500° F. and, because the feed streams to alkylation processes are highly purified to avoid catalyst degradation, is essentially free of sulfur, oxygen, aromatics, naphthenes and other constituents to which the offensive odors of petroleum hydrocarbon streams are generally attributed.

Olefin polymerization processes productive of synthetic branched chain paraffinic hydrocarbons are also well known in the art. Such processes are generally carried out using olefins containing from about 2 to about 7 carbon atoms per molecule and may employ as catalysts phosphoric acid and other acids of phosphorus, complexes of boron fluoride and acids of phosphorus, hydrocarbon esters of acids of phosphorus mixed with acids of phosphorus, sulfuric acid, boron fluoride and sulfuric acid, oxalic acid, aluminum halides, and the like. Such polymerization processes are normally carried out at temperatures in the range of from about 100 to about 500° F. and at pressures from about 200 to about 1200 pounds per square inch. When intended for use as solvents, the products from such processes are generally hydrogenated in order to saturate any residual olefins present therein. Conventional hydrogenation processes employ nickel or molybdenum-containing catalysts at temperatures in the range of from about 350 to about 750° F. and at pressures of from about 100 to about 1500 pounds per square inch. The hydrogenated polymer product thus produced may boil between about 100 and about 500° F., is essentially free of sulfur and other contaminants, and consists almost completely of branched chain paraffin hydrocarbons.

The invention may be more fully understood by referring to the accompanying drawing which depicts a preferred method for improving the odor characteristics of synthetic branched chain paraffin hydrocarbons.

Referring now to the drawing, a malodorous synthetic branched chain paraffinic hydrocarbon stream essentially free of sulfur and oxygen compounds and consisting wholly of paraffins boiling between about 100 and about 500° F. is introduced to the system through line 1 and passed into furnace 2 where it is heated to a temperature of about 450° F. and vaporized. The vaporized feed stream is then passed through line 3 and valve 4 into contacting zone 5. Disposed within the contacting zone is a bed of sodium alumino-silicate particles having uniform pore diameters of about 4 Angstrom units. These adsorbent particles may be supported upon suitable trays or other supports within the contacting zone. Jacketing, heat coils or the like are preferably provided in order to maintain adequate temperature control in zone 5. The feed stream passes upwardly through the alumino-silicate particles and, as it does so, malodorous constituents in the feed are selectively adsorbed. Essentially odorless paraffinic hydrocarbons are withdrawn overhead from line 5 through line 6 containing valve 7 and condensed in condenser 8, from which they are withdrawn as product through line 9. This product stream may be fractionated to produce narrower boiling cuts, solvents boiling between 200 and 300° F., 300 and 400° F. and the like, if desired.

The contacting procedure described above is continued until the adsorbent is no longer effective to produce a substantially odorless product. This point may be readily ascertained by simple odor tests or by refractive index determinations, since it has been found that the malodorous constituents removed by the sieves are normally somewhat higher in refractive index than the substantially odorless product. At this point, sufficient material has been adsorbed by the sieve to require its regeneration. Vales 4 and 7 are thereupon closed and valves 10 and 11 are opened. Air is introduced into the hot sieve bed through line 12 and the adsorbed material is burned. The combustion takes place in a narrow zone which moves upwardly through the bed. At any instant the temperature within the combustion zone may range from about 1000° to about 1500° F. but because of the short time interval during which these conditions prevail at any level in the bed, crystallinity of the sieve is not materially affected. Combustion gases are removed overhead through line 13 containing valve 11. When combustion is complete, as may be determined by the carbon dioxide content of the gases withdrawn through line 13, for example, valves 10 and 11 are closed, valves 4 and 7 are opened, and contacting is resumed. Although only a single contacting zone has been depicted in the drawing, it will be understood that in most instances it will be advantageous to employ a plurality of contacting zones suitably manifolded such that contacting may be carried out upon a continuous basis. The arrangement of multiple vessels to permit this will be obvious to those skilled in the art.

The process of the invention may be still further illustrated by reference to the following examples.

EXAMPLE 1

A hydrogenated tetrapropylene boiling between 167° F. and 429° F. was contacted in vapor phase with a sodium alumino-silicate molecular sieve having uniform pore diameters of 4 Angstrom units. The contacting was carried out at a temperature of 450° F. and at essentially atmospheric pressure. A space velocity of 0.5 volume of hydrogenated tetrapropylene per volume of sieve was used. The yield of product from the contacting step was 99 volume percent. Inspections of the hydrogenated tetrapropylene before and after the contacting step and the results of an odor test of the feed, the product and a commercial "odorless" solvent by a 40 member panel are shown in Table I below.

Table I
TETRAPROPYLENE INSPECTIONS

| | Hydrogenated tetrapropylene | Sieve treated hydrogenated tetrapropylene |
|---|---|---|
| Gravity, °API | 52.2 | 52.5 |
| Bromine number | 1.7 | 1.0 |
| Sulphur, ppm | <1 | <1 |
| ASTM distillation: | | |
| Initial boiling point, °F | 167 | 333 |
| 5% point, °F | 343 | 344 |
| 10% point, °F | 357 | 358 |
| 50% point, °F | 378 | 378 |
| 90% point, °F | 398 | 398 |
| 95% point, °F | 420 | 422 |
| Dry point, °F | 429 | 430 |

ODOR EVALUATION

| | Average score | Necessary difference for significance [1] | Rating |
|---|---|---|---|
| Feed | −0.31 | | 2nd. |
| Product | +0.24 | 0.29 | 1st. |
| "Odorless" solvent | +0.07 | | 1st. |

[1] At 95% confidence level.

The above data show that treatment with the 4 A. molecular sieve significantly improved the odor of the tetrapropylene and resulted in a product much more suitable for use as a solvent than the untreated material and directionally better than the commercial "odorless" solvent. The sulfur content of the tetrapropylene before treatment was less than 1 part per million parts and therefore constituents other than sulfur must have been responsible for the initial offensive odor. A very slight decrease in the bromine number, from about 1.7 to about 1.0, occurred. Although olefins often cause hydrocarbon fractions to have offensive odors and in highly olefinic fractions odor intensity is a direct function of bromine number, this does not appear to be the case with fractions having bromine numbers in the range of from about 0 to 5 and it is believed that the odor of the untreated tetrapropylene was not due to olefins present therein. Aromatic hydrocarbons, also reflected by bromine number, have pungent odors but, since aromatics cannot enter the pores of a 4 A. molecular sieve, it is not likely that either the improvement in odor or the decrease in bromine number can be attributed to the removal of aromatics. The above data show that a very small amount of low boiling material was removed by the sieve treatment but, in view of data obtained in similar experiments wherein essentially no change in boiling range occurred, removal of this was probably not responsible for the improvement in odor.

EXAMPLE 2

A sample of tetrapropylene hydrogenated over a nickel catalyst at 350° F. and 800 pounds per square inch to a bromine number of 4 was passed in vapor phase over a 4 A. molecular sieve at 450° F. and 0.5 volume per volume per hour. Although the sample initially had a relatively strong offensive odor, it was found that the sieve treatment resulted in a product having directionally better odor characteristics than the best "odorless" solvent available. The properties of the tetrapropylene before and after the sieve treatment and the results of odor tests by a 40 member panel are shown in Table II.

Table II
TETRAPROPYLENE INSPECTIONS

| | Hydrogenated tetrapropylene | Sieve treated hydrogenated tetrapropylene |
|---|---|---|
| Gravity, °API | 52.0 | 51.6 |
| Flash (tag), °F | 136 | 140 |
| Kauri-butanol number | 28.5 | 28.5 |
| Aniline point, °F | 181.5 | 182.5 |
| Color, Saybolt | +30+ | +30+ |
| Bromine number | 4 | 3 |
| Paraffins (FIA), vol. percent | 100 | 100 |
| Refractive index | 1.4288 | 1.4283 |
| ASTM distillation: | | |
| Initial boiling point, °F | 366 | 370 |
| 5% point, °F | 370 | 372 |
| 10% point, °F | 373 | 374 |
| 50% point, °F | 384 | 384 |
| 90% point, °F | 404 | 405 |
| 95% point, °F | 415 | 416 |
| Dry point, °F | 444 | 448 |

ODOR EVALUATION

| Solvent | Bromine number | Average score | Nec. diff. for significance [1] | Rating |
|---|---|---|---|---|
| Hydrogenated tetrapropylene | 4 | −0.85 | | 2nd. |
| Sieve treated hydrogenated tetrapropylene | 3 | +0.49 | 0.14 | 1st. |
| "Odorless" solvent | 4 | +0.36 | | 1st. |

[1] At 95% confidence level.

Although the difference between the odor of the sieve-treated hydrogenated tetrapropylene and that of the "odorless" solvent in the above test was not great enough to justify statistically the rating of one above the other at the 95% confidence level, it can be seen from the above data that the solvent prepared by sieve treating hydrogenated tetrapropylene was directionally better than that of the commercial "odorless" solvent. The data show that there was no significant change in the bromine number and boiling range as a result of the sieve treatment. The data also show that the materials adsorbed by the sieve must be relatively high refractive index materials.

EXAMPLE 3

Propylene trimer bottoms hydrogenated over a nickel catalyst at 600° F., 800 p.s.i.g. and 5 v./v./hr. were treated with a 4 Angstrom unit molecular sieve at 450° F. and 0.5 v./v./hr. in a one pass operation. Odor tests of the feed to the sieve treating step and the product withdrawn therefrom showed that treatment with a 4 A. molecular sieve considerably improved the odor of the hydrocarbons.

EXAMPLE 4

A heavy alkylate fraction prepared by reacting equal volumes of isobutane and butylene in the presence of sulfuric acid and then fractionating the product to obtain a 350–400° F. cut was contacted with a 4 A. molecular sieve at 450° F. and 0.5 v./v./hr. A 99% product yield was obtained. Odor tests of this alkylate by a 40 member panel, both before and after the sieve treatment, again showed a significant improvement in odor due to adsorption of malodorous constituents from the alkylate by the sieve.

EXAMPLE 5

In order to determine the effect of acid treating upon the malodorous materials present in synthetic branched chain hydrocarbons, samples of a hydrogenated tetrapropylene were treated with (1) 98% $H_2SO_4$, (2) fuming $H_2SO_4$, and (3) liquid $SO_3$ and then water washed. The treated samples and the untreated tetrapropylene were then evaluated by a 40 member odor panel. The results obtained were as follows:

*Table III*

ACID TREATING HYDROGENATED TETRAPROPYLENE

| | Treat, #/bbl.[1] | | | Product yield approx. (vol. percent) | Bromine number |
|---|---|---|---|---|---|
| | 98% acid | Fuming $H_2SO_4$ | Liquid $SO_3$ (Sulfan) | | |
| Feed | | | | 99+ | 5.0 / 4.6 |
| Sample A | 20 | | | 99 | 4.6 |
| Sample B | 200 | | | 98 | 3.5 |
| Sample C | | 200 | 200 | 95 | 2.3 |

ODOR EVALUATION BY 40 MEMBER PANEL

| | Bromine number | Avg. score | Nec. diff. for significance [2] | Rating |
|---|---|---|---|---|
| 1st test: | | | | |
| Feed | 5 | +0.44 | 0.29 | 1st. |
| Sample A | 4.6 | +0.34 | | 1st. |
| Sample B | 3.5 | −0.78 | | 2nd. |
| 2nd test: | | | | |
| Commercial solvent | 4 | +0.44 | 0.28 | 1st. |
| Feed | 5 | −0.32 | | 2nd. |
| Sample C | 2.3 | −0.12 | | 2nd. |

[1] Followed by water washing several times.
[2] At 95% confidence level.

As can be seen from the above table, acid treating the tetrapropylene did not improve its odor and in some cases actually resulted in odor degradation. None of the acid treated samples compared favorably with the "odorless" commercial solvent. Similar tests have shown that caustic treating is also ineffective for removing malodorous constituents from synthetic branched chain paraffinic hydrocarbons.

EXAMPLE 6

A number of adsorbents conventionally employed for improving the odor and color of petroleum hydrocarbons were tested to determine their effectiveness for removing the malodorous constituents present in synthetic branched chain paraffinic hydrocarbons. Untreated samples of the hydrogenated polypropylene trimer bottoms and the heavy alkylate tested in Examples 3 and 4 were percolated through the adsorbents at room temperature at 10:1 feed-to-adsorbent volume ratios. Odor tests were then made to compare the odors of the treated samples with samples of the untreated materials. It was found that some of the adsorbents produced a slight odor improvement but none of them produced a substantially odorless product such as was obtained by treatment with a 4 A. molecular sieve.

The results of these tests are shown in Table IV.

*Table IV*

EFFECT OF ADSORBENTS ON SOLVENT ODORS

| Adsorbent | Odor rating [a] | |
|---|---|---|
| | Hydrogenated trimer bottoms [1] | Heavy alkylate bottoms [2] |
| None | 3 | 3 |
| Hy-Flo Supercel [3] | 3 | 3 |
| Darco carbon black [4] | 3 | 2 |
| Magnesol [5] | 2 | 2 |
| Filtrol clay [6] | 3 | 3 |
| Pembina clay [7] | 3 | 2 |
| Florisil [8] | 2 | 3 |
| Silica gel | 2 | |
| Activated alumina | 3 | |

[a] Odor ratings: 1=Substantially odorless, equivalent to product treated with 4 A. sieve. 2=Slight improvement. 3=No improvement.
[1] Solvent tested in Example 3.
[2] Solvent tested in Example 4.
[3] A trademark of the Johns-Manville Sales Corp. for an exceptionally pure diatomaceous silica.
[4] A trademark of the Darco Dept. of the Atlas Powder Co. for an activated carbon commonly used in dry cleaning industry to restore odor of used solvent.
[5] A trademark of the Westvaco Chemical Division of the Food Machinery and Chemical Corporation for a synthetic hydrous magnesium silicate often used to restore odor of used dry cleaning solvents.
[6] A trademark of the Filtrol Corp. for an acid activated adsorbent made from montmorillonite clay.
[7] A clay adsorbent similar to Filtrol above.
[8] Activated magnesium silicate marketed by the Floridin Co.

Even though the adsorbents tested above are normally effective for improving the odor of hydrocarbon solvents under the conditions employed, it can be seen from Table IV that such adsorbents have little effect upon the odor of solvents produced from synthetic branched chain paraffin hydrocarbons. The malodorous constituents in such solvents are apparently of a different type from those conventionally removed to improve solvent odor and, in view of the above data, it is surprising that they are selectively adsorbed by 4 A. molecular sieves.

EXAMPLE 7

Hydrogenated propylene trimer bottoms similar to those employed in the preceding example were treated with 1% of attapulgus clay at 400° F., 800 p.s.i.g. and 10 v./v./hr. equivalent feed rate. Although only 0.25% of this adsorbent is effective for improving the odor of benzene at temperatures of 300° to 500° F., odor tests of the feed and treated product showed no perceptible improvement in the odor of the trimer bottoms. After treatment they remained unacceptable for use as a solvent. Similar tests using normal sodium phosphate also failed to show any improvement in the odor of the hydrogenated propylene trimer bottoms.

EXAMPLE 8

Further tests were carried out wherein samples of hydrogenated propylene trimer bottoms boiling between 298° F. and 409° F. and a heavy alkylate fraction boiling between 356° F. and 378° F. were contacted with a zeolite adsorbent not possessing the uniform pore spaces which characterize molecular sieve adsorbents. The odor characteristics of the hydrogenated tetrapropylene and the heavy alkylate bottoms were essentially the same as those of the untreated synthetic solvents employed in the previous examples. The zeolite employed was one consisting of 12.5 mol percent of $Na_2O$, 12.5 mol percent of $Al_2O_3$ and 75 mol percent of $SiO_2$ which is marketed by the Permutit Company under the trademark "Decalso." Separate samples of each of the feeds were contacted with the zeolite at temperatures of 80° F. and 450° F. The procedure described in Example 6 was employed in the 80° F. tests. The 450° F. tests were carried out as described in Example 4 with a feed rate of 0.5 v./v./hr. The odors of the samples were evaluated by a 40 member odor panel after treatment with the zeolite and were compared with the "odorless" commercial solvent used as a basis of comparison in the preceding examples. The results obtained are shown in the following table.

*Table V*

ODOR EVALUATION OF SOLVENTS BY 40 MEMBER PANEL

|  | Avg. score | Nec. diff. for significance [1] | Rating |
|---|---|---|---|
| Commercial solvent [2] | +0.81 | 0.17 | 1st. |
| Hydrog. trimer bottoms [3] | −0.45 |  | 2nd. |
| Do.[4] | −0.36 |  | 2nd. |
| Commercial solvent [2] | +0.81 | 0.22 | 1st. |
| Heavy alkylate fraction [3] | +0.04 |  | 2nd. |
| Do.[4] | −0.85 |  | 3rd. |

[1] At 95% confidence level.
[2] "Odorless" solvent.
[3] Passed as vapor through bed of non-crystalline zeolite at 450° F. and 0.5 v./v./hr.
[4] Percolated through bed of non-crystalline zeolite at 80° F. in a 10:1 feed/adsorbent volume ratio.

The data in the above table show that the products contacted with the noncrystalline zeolite adsorbent were greatly inferior to the commercial "odorless" solvent. Actually, this adsorbent degraded the odor of the hydrogenated trimer bottoms and the heavy alkylate in both the high temperature and the low temperature runs. This clearly indicates that the constituents in these solvents which are responsible for their bad odor are not selectively removed by adsorbents which have essentially the same chemical composition as 4 A. molecular sieves but which lack the uniform pore structure of the molecular sieves. It is thus essential that the adsorbents employed for improving the odors of synthetic solvents in accordance with the invention be molecular sieve adsorbents.

What is claimed is:

1. A process for improving the odor characteristics of a malodorous synthetic branched chain paraffin hydrocarbon fraction essentially free of sulfur and oxygen compounds and boiling over a range falling within about 100° and 500° F., said fraction being a member of the group consisting of alkylates and hydrogenated polymerizates, which comprises contacting said fraction with a crystalline metallic alumino-silicate zeolite having uniform pore diameters of about 4 Angstrom units at a temperature in the range of from about 250° to 700° F.

2. A process as defined by claim 1 wherein said fraction is contacted with said alumino-silicate in vapor phase.

3. A process as defined by claim 1 wherein said fraction is contacted with said alumino-silicate at a pressure of from about 50 mm. of mercury to about 100 p.s.i.

4. A process according to claim 1 wherein said hydrocarbon fraction is a hydrogenated polymerizate.

5. The process of claim 1 wherein said hydrocarbon fraction comprises primarily hydrogenated tetrapropylene.

6. A process for improving the odor characteristics of a malodorous synthetic branched chain paraffin hydrocarbon fraction essentially free of sulfur and oxygen containing compounds and boiling over a range falling within about 100° and 500° F., said fraction being a hydrogenated polyolefin, which comprises contacting at 250° to 700° F. said fraction with a crystalline metallic aluminosilicate zeolite having uniform pore diameters of about 4 Angstrom units.

7. A process for improving the odor characteristics of a malodorous synthetic branched chain paraffin hydrocarbon fraction essentially free of sulfur and oxygen containing compounds and boiling over a range falling within about 100° and 500° F., said fraction being an alkylate, which comprises contacting at a temperature of 250° to 700° F. said fraction with a crystalline metallic aluminosilicate zeolite having uniform pore diameters of about 4 Angstrom units.

8. A process for removing malodorous constituents from a synthetic branched chain paraffin solvent essentially free of sulfur and oxygen compounds, said solvent consisting essentially of paraffins boiling over a range falling within about 100° to 500° F., said solvent being a member of the group consisting of alkylates and hydrogenated polymerizates, said process comprising contacting said solvent in vapor phase at a temperature in the range of from about 250° to about 700° F. with a crystalline metallic alumino-silicate zeolite having uniform pore diameters of about 4 Angstrom units in a contacting zone, withdrawing solvent of improved odor characteristics from said contacting zone, continuing said contacting until said alumino-silicate is spent, and thereafter regenerating said alumino-silicate.

9. A process as defined by claim 8 wherein said alumino-silicate is a sodium alumino-silicate.

10. A process as defined by claim 8 wherein said solvent is contacted with said alumino-silicate at a temperature of from about 400° to about 500° F.

11. A process as defined by claim 8 wherein said solvent is contacted with said alumino-silicate at a pressure of from about 50 mm. of Hg to about 100 p.s.i.

12. A process as defined by claim 8 wherein said alumino-silicate is regenerated by passage of an oxygen-containing gas in contact therewith at an elevated temperature.

References Cited in the file of this patent

UNITED STATES PATENTS

| 2,764,621 | Fulton | Sept. 25, 1956 |
| 2,799,718 | Scovill et al. | July 16, 1957 |
| 2,818,137 | Richmond et al. | Dec. 31, 1957 |
| 2,866,835 | Kimberlin et al. | Dec. 30, 1958 |
| 2,908,639 | Carter et al. | Oct. 13, 1959 |
| 2,920,038 | Feldbauer et al. | Jan. 5, 1960 |

FOREIGN PATENTS

| 777,232 | Great Britain | June 19, 1957 |

OTHER REFERENCES

Petroleum Engineer—Refining Section, February 1957, p. C-53.

Petroleum Refiner, vol. 36, No. 7, pp. 136–140, July 1957.